United States Patent [19]

Stoltman et al.

[11] Patent Number: 5,029,570
[45] Date of Patent: Jul. 9, 1991

[54] EXHAUST GAS RECIRCULATION CONTROL

[75] Inventors: Donald D. Stoltman, Henrietta; Daniel F. Kabasin, Rochester, both of N.Y.

[73] Assignee: General Motors Corporation, Detroit, Mich.

[21] Appl. No.: 605,055

[22] Filed: Oct. 25, 1990

[51] Int. Cl.⁵ .................................. F02M 25/07
[52] U.S. Cl. ................................... 123/571
[58] Field of Search .................. 123/571, 494

[56] References Cited

U.S. PATENT DOCUMENTS

| | | | |
|---|---|---|---|
| 4,173,205 | 11/1979 | Toelle | 123/571 |
| 4,383,441 | 5/1983 | Willis et al. | 73/117.3 |
| 4,397,289 | 8/1983 | Haka et al. | 123/571 |
| 4,450,808 | 5/1984 | Moriyama et al. | 123/571 X |
| 4,548,185 | 10/1985 | Pozniak | 123/571 |
| 4,556,039 | 12/1985 | Kniss et al. | 123/571 X |
| 4,671,107 | 6/1987 | Chiesa et al. | 73/118.2 |
| 4,770,146 | 9/1988 | Shibata et al. | 123/571 X |
| 4,770,148 | 9/1988 | Hibino et al. | 123/571 |
| 4,825,841 | 5/1989 | Norota et al. | 123/571 |

Primary Examiner—Willis R. Wolfe
Attorney, Agent, or Firm—Howard N. Conkey

[57] ABSTRACT

A method for recalibration of parametric relationships used in exhaust gas recirculation EGR control. When such recirculation would typically be inactive, relationships between parameters are measured, such relationships being normally measurable only with inactive EGR. New information from those measurements is combined with information from previous calibrations to provide update information necessary for subsequent EGR control.

6 Claims, 6 Drawing Sheets

EXHAUST GAS RECIRCULATION CONTROL

FIELD OF THE INVENTION

This invention relates to exhaust gas recirculation control systems for internal combustion engines.

BACKGROUND OF THE INVENTION

In recent years, the need for a cleaner atmosphere has become apparent. Manufacturers of vehicles powered by internal combustion engines, in the furtherance of this societal need, have undertaken a major effort to reduce the levels of undesirable emissions present in vehicle exhaust.

Oxides of nitrogen NOx, one of the many components in internal combustion engine emissions, has received much attention in emission control efforts. A common method for reducing NOx is recirculation of engine exhaust gas back into the air inlet of the engine to be combined with the incoming air charge, a process often called charge dilution or exhaust gas recirculation. By feeding the engine a combination of fresh inlet air and exhaust gas, the heat absorbing capacity of the air charge is increased and the overall oxygen content of the air charge is decreased. Increasing the heat absorbing capacity holds down engine combustion temperature, thereby inhibiting NOx formation. Decreasing oxygen content also decreases NOx formation by reducing the availability of one of its constituent elements.

In general, the more exhaust gas combined with the inlet air charge, the lower the production of NOx. However, beyond some point, the recirculation of exhaust gas increases the engine's emission of other pollutants in an unacceptable manner. Controlling exhaust gas recirculation EGR to achieve acceptable levels of all emission components while maintaining acceptable vehicle driveability is an increasingly difficult problem as emission constraints tighten and as vehicle operators expect more driveable vehicles.

Methods for controlling EGR according to predetermined engine operating conditions are in the prior art. Systems are available that admit an amount of exhaust gas into the air inlet according to such parameters as engine speed, engine temperature or engine intake manifold absolute pressure. Such systems sense these engine parameters and open an EGR valve, admitting exhaust gas into the inlet air charge in a quantity related to the sensed parameters. Such systems operate under the assumption that the relationship between these engine parameters will remain constant over the operational life of the system.

These systems achieve some success in NOx reduction, but their performance decays as the discussed relationships change. Over the life of an engine, system voltages can drift, affecting the integrity of sensed engine parameters. Additionally, engine parameters and their relationship to each other can change, and sensor accuracy may deteriorate. As traditional EGR systems are based on predetermined relationships between these sensed parameters, their performance is necessarily limited by the integrity of the sensors, the constancy of the supply voltages and the constancy of the relationships.

SUMMARY OF THE INVENTION

This invention overcomes the shortcomings of the prior systems by basing the air inlet charge dilution not on predetermined relationships that must be assumed to be constant, but on relationships that are repeatedly recalibrated over the operating life of the system.

In general, this method recalibrates the relationship between engine parameters used in EGR control, such as the relationship between engine intake manifold absolute pressure and engine load, when the engine is operating within either a high speed and load region or a low speed and load region. In conventional systems, engine load is determined in a variety of ways, for example by measuring engine air ingestion per cycle. The accuracy of the measurement of the relationship between EGR control parameters can be reduced with active EGR. However, while the engine is operating in the two described regions, EGR is inactive, such that accurate measurements of these relationships can be made. Accordingly, accurate recalibration of important relationships can take place without disrupting emission control. After measuring these relationships, a desired inlet air charge dilution factor is determined, based on the recalibrated relationships. Exhaust gas can then be recirculated in a conventional manner so as to achieve the desired inlet charge dilution.

The performance of this system is not limited by the continued accuracy of a one-time calibration. By compensating for changes in parametric relationships, this system tolerates inevitable system changes by maintaining proper charge dilution despite those changes, thereby furthering the need for improved vehicle emissions.

DESCRIPTION OF THE PREFERRED EMBODIMENT

Figures 1, 2, 3:
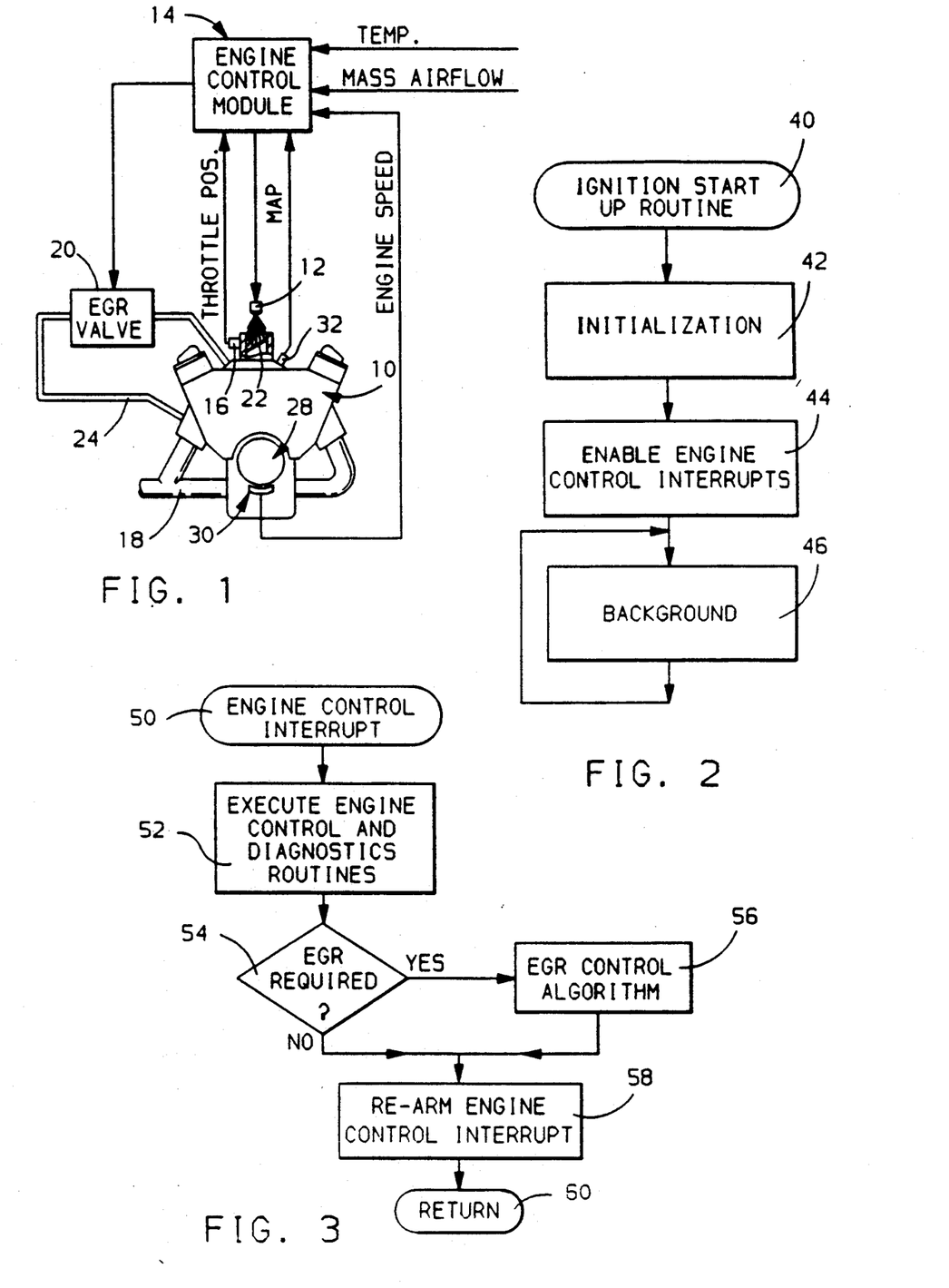
FIG. 1 is a general diagram of the engine control system for controlling the air inlet charge dilution in accord with the principles of this invention.
FIG. 2 is a diagram of the controller start-up routine used by the controller of FIG. 1.
FIG. 3 is a diagram of the steps taken by the controller of FIG. 1 to service an engine control interrupt in accord with this invention.

Referring to FIG. 1, an internal combustion engine 10 is provided fuel by some conventional fuel delivery system, such as a single fuel injector 12 controlled by an engine control module ECM 14 to inject fuel into the air inlet of the engine at a location above a conventional throttle valve 22.

Air is drawn through the throttle bore of the engine, wherein the throttle valve 22 is located to control the amount of air allowed into the engine in proportion to the desired operating speed of the engine. In this embodiment, the valve consists of a flat blade 22 which rotates with respect to the air inlet. The position of the blade 22 may be controlled by any conventional throttle control system, such as a mechanical coupling to a vehicle accelerator pedal, or an electromechanical actuator linked to the blade and controlled by the ECM 14. A conventional throttle position sensor 16 is associated with the throttle blade 22 to measure the blade position and transmit the measurement to the ECM 14.

A conventional absolute air pressure sensor 32 is located in the intake manifold for measuring the absolute pressure of the air present therein. This sensor transduces the pressure into a scaled voltage which is transmitted to the ECM as manifold absolute pressure MAP.

The delivered fuel is combined with the inlet air and is ingested into the engine. The quantity of fuel delivered is controlled by the ECM and is based on the desired air fuel ratio, which is related to the engine load EL. As discussed, engine load is a function of the rate that the engine is consuming air, and may be measured by measuring the mass airflow into the engine using a conventional mass airflow sensor.

As the fuel air mixture is guided through the engine 10, it is distributed to the cylinders of the engine, where it is ignited in any conventional manner, the product of the ignition being expelled as exhaust gas through exhaust port 18.

A closed conduit 24 is attached between the exhaust port of the engine 18 and the intake manifold for transporting a quantity of the exhaust gas back to be recirculated into the engine with the engine intake air, according to the conventional process of exhaust gas recirculation EGR. A valve 20 is situated in the conduit 24 to meter the quantity of recirculated exhaust gas in accord with the principles of this invention. The valve 20 can be any conventional valve capable of controlling the flow of a gaseous substance, such as a conventional butterfly valve.

The ignited air fuel mixture creates a force which ultimately rotates the crankshaft of the engine 28 in the usual manner. A conventional rotational speed sensor 30 is located in proximity to the crankshaft of the engine 28 to sense the rotational speed of the crankshaft. The sensed value is transmitted to the engine control module ECM 14 as a measurement of engine speed RPM.

The ECM 14 takes the form of a standard digital computer, such as a Motorola MC68HC11 single chip microcomputer. The principles of this invention are implemented in the form of an operating program stored in the computer's memory.

Generally, the ECM, in carrying out the principles of this invention, decides whether operating conditions permit EGR control. If EGR is permitted, the computer reads the present engine speed and load. If these are within a first region associated with a low engine speed and load, or are within a second region associated with a high engine speed and load, an EGR parameter recalibration will take place. Otherwise, the ECM will recirculate an amount of exhaust gas into the engine intake manifold in a quantity consistent with the present engine operating conditions and with the information from the most recent recalibration.

In this embodiment, the recalibration of engine parameters used in EGR control involves re-establishing the relationship between engine load EL and manifold absolute pressure MAP operable over the entire engine operating range. This relationship is central to EGR control, and can vary as engine operating conditions change, sensor voltages drift, or sensor accuracy deteriorates. This recalibration attempts to account for those changes such that an appropriate amount of EGR, based directly on the re-established relationship, is administered to the engine despite such changes.

Referring to FIG. 2, when power is first applied to the system, such as when the vehicle ignition switch is turned to its "on" position, the ECM initiates the engine control program at step 40 and then proceeds to step 42 where the ECM provides for system initialization. For example, at this step data constants are transferred from ROM locations to RAM locations and counters, flags and pointers are initialized.

After the initialization step, the ECM proceeds to step 44, where interrupts used in vehicle control, including engine control and EGR control in accord with this invention are enabled. The interrupt pertaining to execution of the routine incorporating the principles of this invention is enabled at this step. The ECM then proceeds to a background loop at step 46 which is continuously repeated. This loop may include system diagnostic and maintenance routines. In this embodiment, the ECM interrupts the background loop every 12.5 milliseconds to execute a general routine incorporating the principles of this invention.

This general routine is illustrated in FIG. 3, and is entered at step 50. The ECM proceeds to step 52 where engine control and diagnostics routines are executed. These may include conventional routines to control various engine control and diagnostic functions.

Next, at step 54, the ECM determines whether the present operating conditions permit EGR. This determination involves analysis common in the art of EGR control. For example, the operating temperature of the system may be compared to a predetermined threshold temperature. If the operating temperature is below the threshold temperature, EGR may not be attempted, as engine warm-up and driveability concerns may override emission concerns at these temperatures.

If, at step 54, conditions permit use of EGR, the ECM proceeds to step 56, where a specific EGR control algorithm incorporating the principles of this invention is executed. After execution of this algorithm, or if EGR is not required, the ECM, at step 58, re-arms the engine control interrupt such that the engine control and diagnostics routines will be repeated after a predetermined amount of time. Next, at step 60, the ECM returns to the background loop of FIG. 2.

Figure 4A:
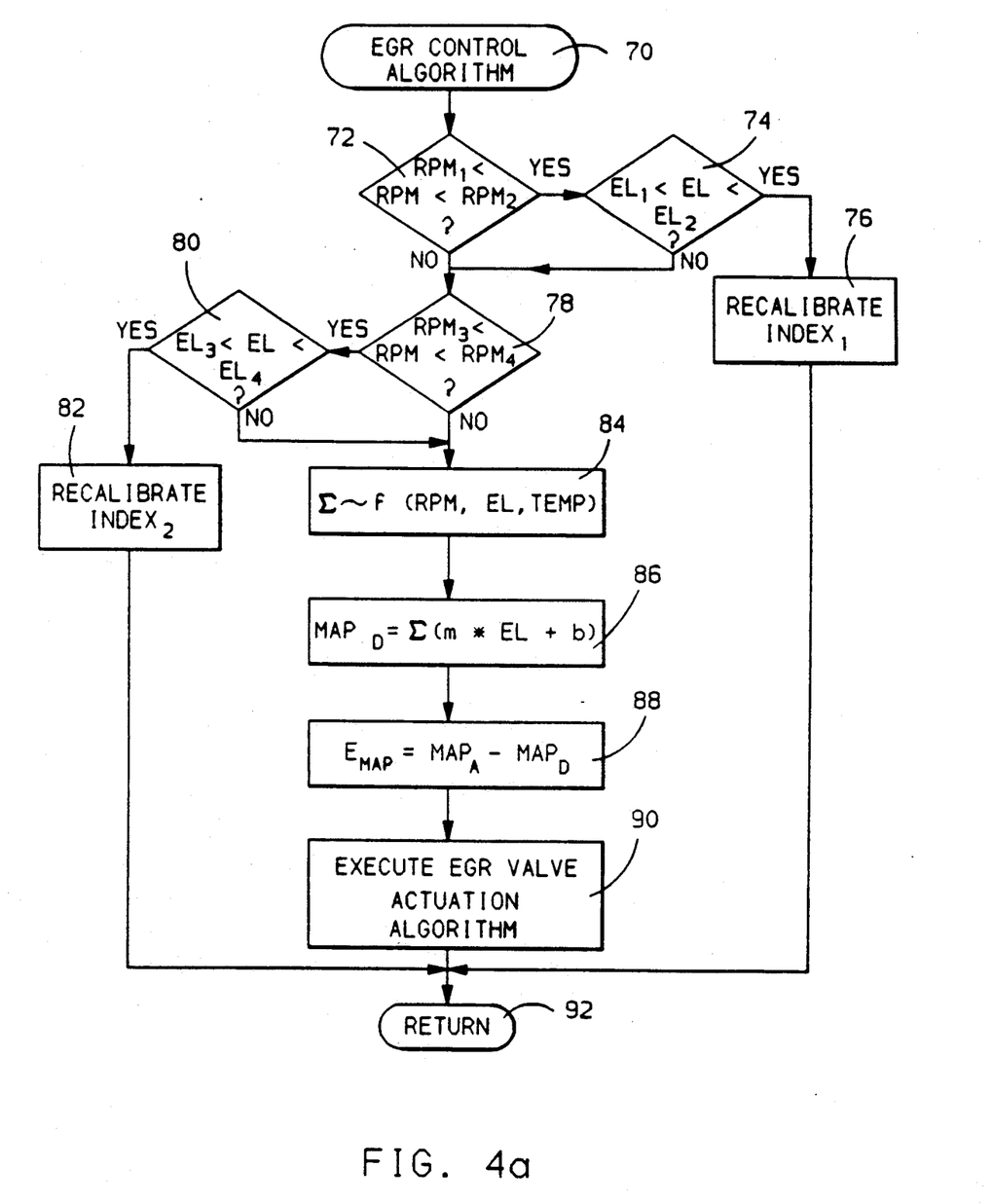
FIGS. 4a and 4b are diagrams illustrating in step by step form and in geometric form the EGR control process in accord with the principles of this invention.
Figure 4B:
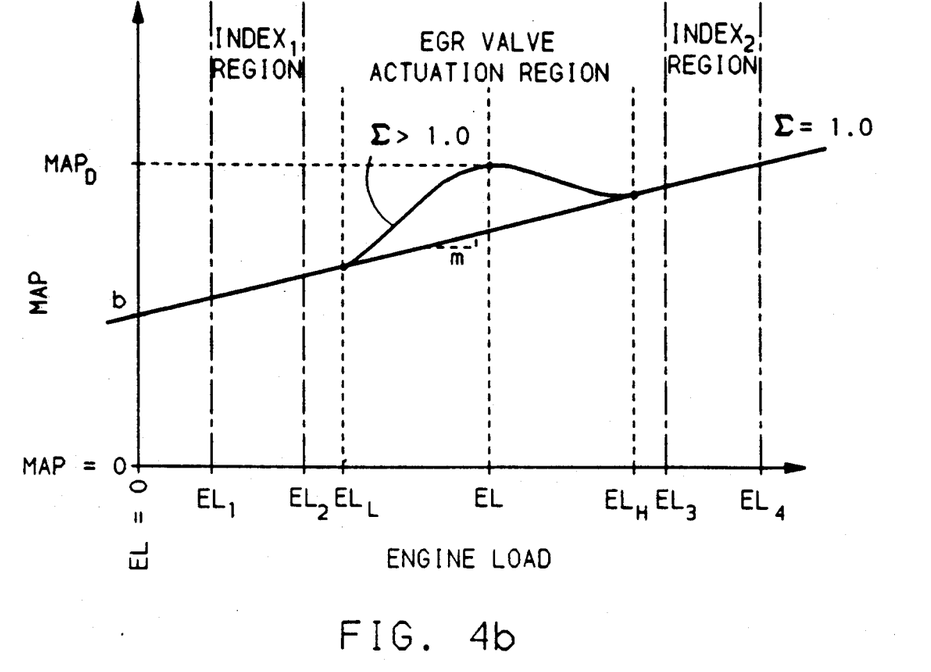

The steps involved in the specific routine incorporating the principles of this invention are illustrated in FIG. 4a. Generally, the ECM determines whether, under the current engine operating conditions, EGR will provide favorable results. In this embodiment, such results are assumed if the engine is not operating within either the $index_1$ region or the $index_2$ region, as shown in FIG. 4b.

Conventional engine control systems using EGR have operating regions commonly quantified using engine speed and engine load wherein the tradeoff between improvement in emissions and vehicle driveability makes the use of EGR unattractive. Two of these regions are shown as the $index_1$ region and the $index_2$ region of FIG. 4b. The $index_1$ region is shown in FIG. 4b as the range of low engine loads wherein EGR is commonly disabled, primarily due to driveability concerns. The $index_2$ region is also illustrated in FIG. 4b as the range of engine loads corresponding to a high performance engine operating condition wherein EGR is commonly disabled, as otherwise it would reduce engine performance by reducing the oxygen content of the inlet air charge. Two similar regions, not shown, exist for engine speed, one at a low engine speed and one at a high engine speed. In this embodiment, engine speed and engine load must both be within a predetermined high or low range for EGR to be found undesirable.

Consequently, while the engine is operating within either the low speed and load ranges or the high load and speed ranges an opportunity exists to recalibrate EGR parameters, as this calibration normally requires that EGR be disabled. The result of this recalibration is an updated linear model of the relationship between engine parameters commonly used in EGR control, manifold absolute pressure and engine load in this embodiment, using one point at a low engine operating extreme from the $index_1$ recalibration and one point at a high engine operating extreme from the $index_2$ recalibration.

Specifically, to carry out the principles of this invention, the ECM enters the routine illustrated in FIG. 4a at step 70 and proceeds to step 72 where the present engine speed RPM is compared to two predetermined engine speed limits $RPM_1$ and $RPM_2$.

These limits are calibrated for a specific engine and are upper and lower engine speed limits defining a low engine speed region wherein EGR is not normally used. If the sensed engine speed is within this region, the first condition required for $index_1$ recalibration has been met, and the routine proceeds to check engine load EL at step 74. If EL is within a load region bounded by $EL_1$ and $EL_2$, illustrated as the "$index_1$ region" in FIG. 4b, the second condition required for $index_1$ recalibration has been met. These first and second conditions are a means by which the routine determines whether EGR is disabled, such that $index_1$ recalibration is possible.

Accordingly, if both engine speed and engine load are within the predetermined regions at steps 72 and 74, the ECM proceeds to step 76 where $index_1$ is recalibrated. After this recalibration, the ECM returns, via step 92, to step 58 of FIG. 3.

If, at step 72, the sensed engine speed is outside the predetermined low speed region or, at step 74 the sensed engine load is outside the $index_1$ region, the ECM proceeds to step 78 to check a second pair of regions which constitute two requirements necessary for $index_2$ recalibration.

This second recalibration provides a second piece of information which, when combined with the most recent information from the $index_1$ recalibration, establishes a linear model of the relationship between engine parameters used in EGR control. In this embodiment, these parameters are engine load and manifold absolute pressure. This relationship, illustrated as the $\Sigma = 1.0$ line of FIG. 4b, is then used as the basis for calculation of the manifold absolute pressure necessary to achieve a desired amount of inlet air charge dilution when such charge dilution later becomes desirable.

Specifically, at step 78 the present engine speed is compared to a high speed region defined by $RPM_3$ and $RPM_4$. If the engine speed is within that region, the first condition necessary for $index_2$ recalibration has been met, and the routine proceeds to step 80, where the present engine load is compared to a load region defined by $EL_3$ and $EL_4$. This load region is illustrated as the "$index_2$ region" of FIG. 4b. If EL is within this region, the second condition required for $index_2$ recalibration has been met, and the routine to recalibrate $index_2$ is executed at step 82. The routine then returns, via step 92, to step 58 of the routine illustrated in FIG. 3.

If the present engine speed and load do not allow $index_1$ or $index_2$ recalibration, the ECM then will activate EGR via steps 84 through 90 so as to dilute the inlet air charge in a quantity appropriate for the present engine operating conditions, based on the most recent calibration of $index_1$ and $index_2$.

Specifically, at step 84, a charge dilution factor $\Sigma$, greater than or equal to one, is selected in a conventional manner, for example from a predetermined calibration table based on engine parameters commonly found to be significant in EGR control, such as engine speed, engine temperature and engine load. This factor can be precalibrated in a conventional EGR calibration process, and is proportional to the amount of EGR, as a percentage of overall engine inlet air mass, that will provide a desired tradeoff between engine emissions and engine driveability. After a dilution factor has been selected, the ECM proceeds to step 86, where the desired manifold absolute pressure $MAP_D$ is calculated according to the following equation $$MAP_D = \Sigma(m*EL + b)$$

where m is the slope of the linear model of the relationship between engine load EL and manifold absolute pressure MAP illustrated as the $\Sigma = 1.0$ line of FIG. 4b, and b is the intercept of that line with the EL = 0 line of FIG. 4b.

$MAP_D$ is illustrated in FIG. 4b as the MAP value corresponding to the the point on the $\Sigma > 1.0$ line at the sensed engine load EL. The shape of the $\Sigma > 1.0$ line is shown to illustrate a well known relationship between $\Sigma$, MAP and EL.

Returning to FIG. 4a, the ECM, after calculating the desired MAP, proceeds to step 88, where the MAP error $E_{MAP}$ is calculated as the difference between the $MAP_D$ and a measured value of actual MAP from the MAP sensor. The ECM then proceeds to step 90, where an EGR valve actuation routine is executed to adjust the EGR valve position in such a manner as to drive this MAP error to zero.

A pressure difference exists across the EGR valve such that when the valve is opened, exhaust gas passes through the EGR conduit and enters the intake manifold, increasing the pressure therein. The EGR valve can be controlled in a manner such that the actual pressure approaches the desired pressure in an appropriate manner. Any EGR valve control strategy, such as a conventional proportional plus integral plus derivative control scheme may be included in this routine to so control the valve. Accordingly, the EGR valve is the means by which a desired MAP is reached which will, when using the recalibration values found in accord with this invention, result in the desired inlet air charge dilution. After the EGR valve is adjusted at step 90, the ECM, at step 92, returns to step 58 of the routine described by FIG. 3.

Figure 5A:
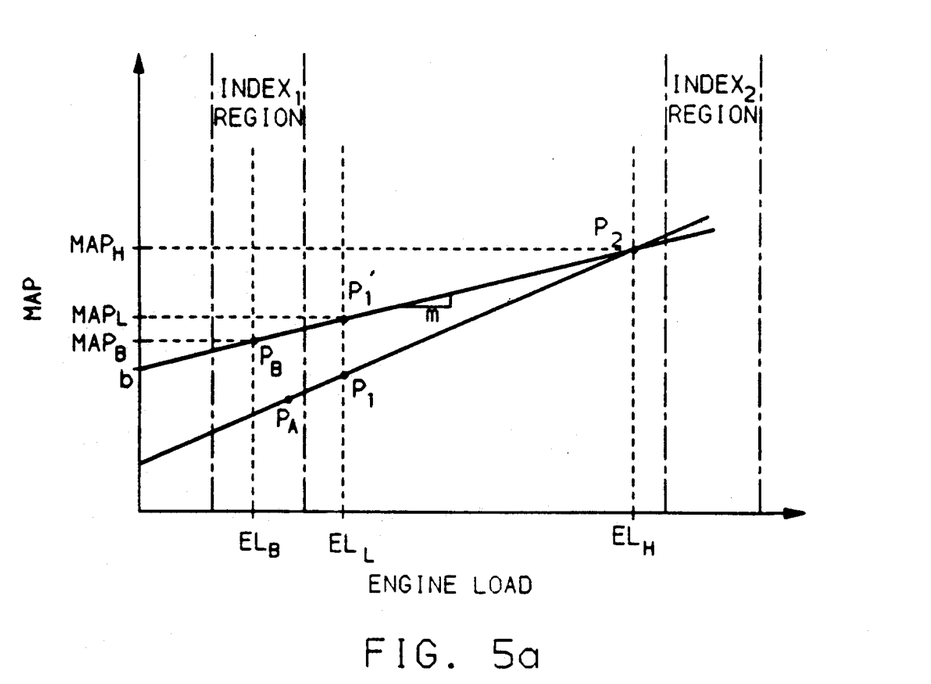
FIGS. 5a, 5b, 6a and 6b are diagrams showing in step by step form and in geometric form the process of EGR recalibration in accord with this invention.
Figure 5B:
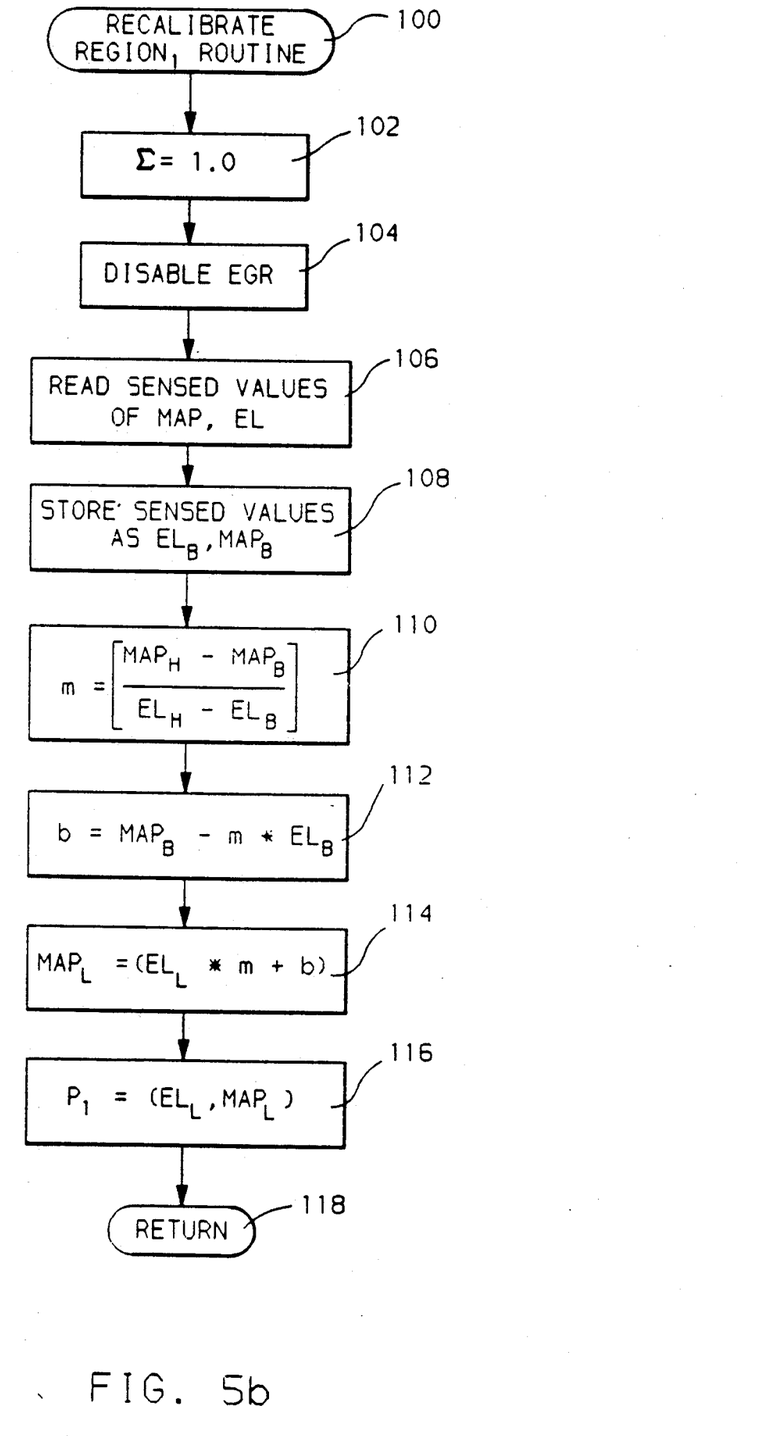

The process of recalibration of $index_1$, which is the first of two points used to describe the relationship between engine load and engine manifold absolute pressure, is illustrated geometrically in FIG. 5a and is described in a step-by-step manner in FIG. 5b.

To carry out this recalibration, the ECM enters the recalibration routine at step 100. It then proceeds to step 102, where the dilution factor $\Sigma$ is set to 1.0, indicating that the inlet air will not be diluted during the course of this recalibration. Next, the ECM proceeds to step 104 where EGR is disabled, for example by overriding the EGR valve control and closing the EGR valve.

The ECM then, at step 106, reads the present manifold absolute pressure MAP and the present engine load EL, and stores the two values as $MAP_B$ and $EL_B$, respectively, at step 108. Next, at step 110, the ECM uses the point on the two dimensional graph of MAP vs. EL described by $MAP_B$ and $EL_B$, and determines the slope m of a line formed by joining that point and the most recent calibrated $index_2$ point, shown in FIG. 5a as $P_2$. The slope of that line is found according to the following equation $$m = (MAP_H - MAP_B)/(EL_H - EL_B)$$

where $MAP_H$ and $EL_H$ are the MAP value and the engine load value that define the point $P_2$ of FIG. 5a. The ECM then proceeds to step 112, where the y-intercept b of the line defined by the point $P_2$ and the point described by $MAP_B$ and $EL_B$ is calculated according to the following equation $$b = MAP_B - m * EL_B.$$

The line defined by the calculated slope and y-intercept is then used to describe the relationship between MAP and EL necessary for subsequent inlet air charge dilution in accord with the routine illustrated in FIG. 4a. This line, replacing the $\Sigma = 1.0$ line of FIG. 4b, will be so used until conditions permit the next recalibration of the charge index.

Next, at step 114, the MAP value corresponding to the intersection between the new calibrated line and a fixed line described by $EL_L$ is calculated according to the following equation $$MAP_L = EL_L * m + b.$$

This intersection is illustrated geometrically in FIG. 5a. $EL_L$ is a predetermined engine load value. The point described by $MAP_L$ and $EL_L$, shown as $P1'$ in FIG. 5a, is stored in memory at step 116 as the new $P_1$ point, replacing the previous $P_1$ point. This point $P_1$ is then used as a reference point in future $index_2$ recalibrations, just as the point $P_2$ was used in step 110 of this $index_1$ recalibration. The ECM then returns, via step 118, to step 92 of the routine illustrated in FIG. 4a.

Figure 6A:
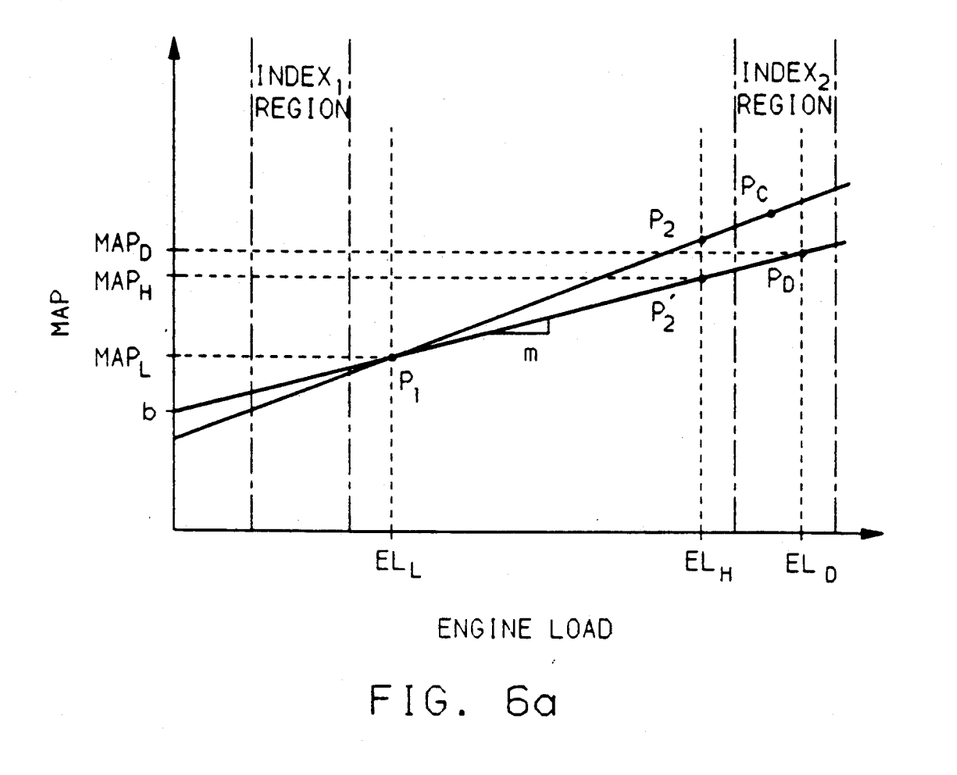
Figure 6B:
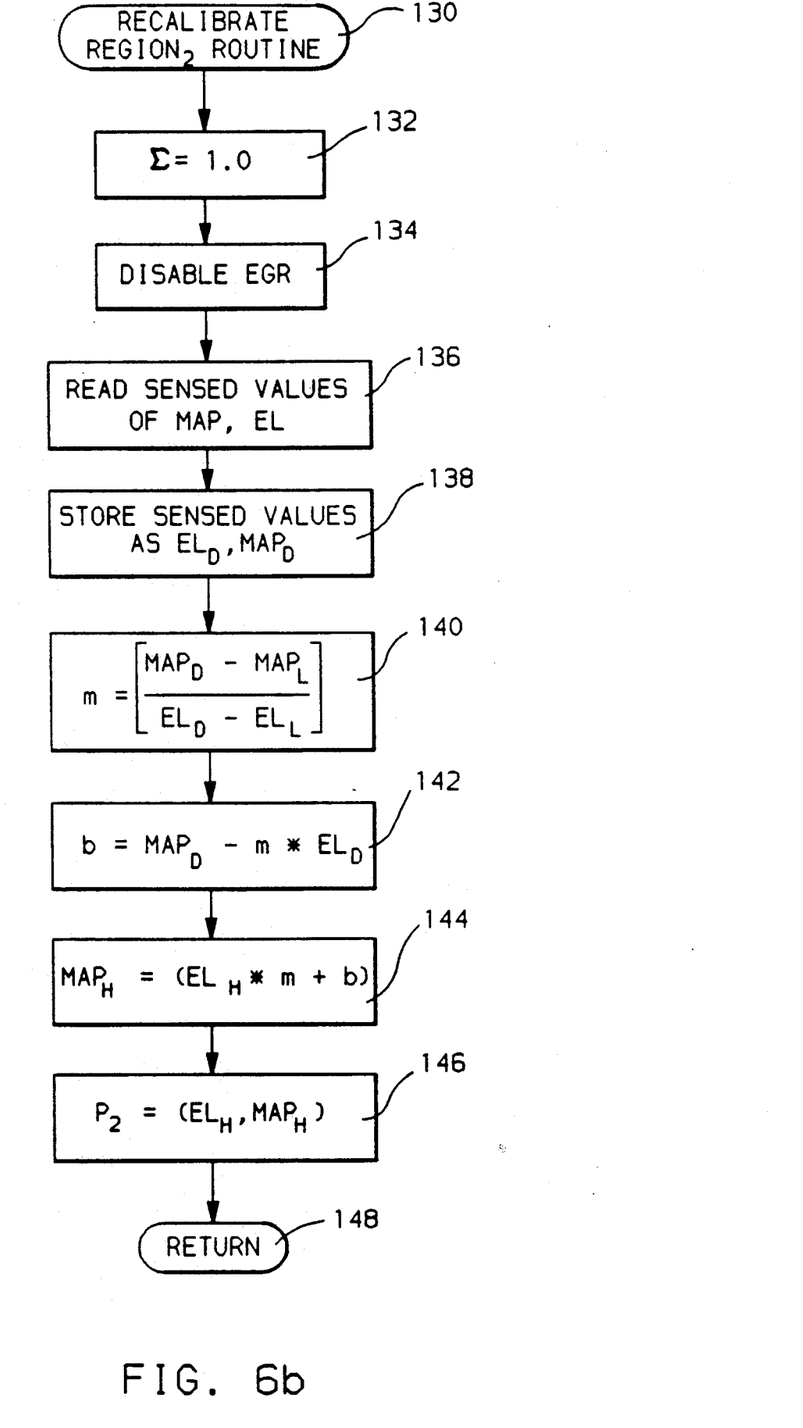

The recalibration of $index_2$, similar to the recalibration of $index_1$, is illustrated geometrically in FIG. 6a, and is illustrated in step by step form in FIG. 6b. Generally, in a manner similar to the $index_1$ recalibration, the relationship between MAP and EL at a high engine operating point, i.e. a point within the region shown in FIG. 6a as the $index_2$ region, is recalibrated. The measured relationship is combined with the value from the most recent $index_1$ recalibration to describe a linear relationship between MAP and EL over the entire engine operating range. Subsequent EGR calculations are then based on this relationship.

Specifically, at steps 78 and 80 of FIG. 4a, if the ECM determines that $index_2$ is to be recalibrated, the ECM proceeds to the routine illustrated in FIG. 6b, starting at step 130. The ECM then sets the dilution factor $\Sigma$ to 1.0 at step 132, indicating that the inlet air charge will not be diluted by exhaust gas during the course of the recalibration. The ECM then, at step 134, disables the EGR system altogether, for example by overriding the EGR valve control and closing the EGR valve.

The present values of manifold absolute pressure MAP and engine load EL are then read from their corresponding sensors at step 136, and are stored in RAM at step 138 as $MAP_D$ and $EL_D$, respectively. The point defined by $MAP_D$ and $EL_D$ is illustrated in FIG. 6b and $P_D$. The slope m of the line defined by $P_D$ and the point $P_1$, which is the reference point from the last calibration of $index_1$, is next calculated at step 140 according to the following equation $$m = (MAP_D - MAP_L)/(EL_D - EL_L)$$

where $MAP_L$ and $EL_L$ are the manifold absolute pressure and the engine load that define the point $P_1$. Once the slope of that line is known, the corresponding y-intercept b of the line, or the theoretical MAP value corresponding to zero engine load may be calculated at step 142 according to the following equation $$b = MAP_D - m * EL_D.$$

The line defined by the calculated slope and y-intercept is then used to describe the relationship between MAP and EL necessary for future inlet air charge dilution in accord with the routine illustrated in FIG. 4a. This line, replacing the $\Sigma = 1.0$ line of FIG. 4b, will be so used until conditions permit the next recalibration of the charge index.

Next, at step 144, the MAP value corresponding to the intersection between the new calibrated line and a fixed line described by $EL_H$ is calculated according to the following equation $$MAP_H = EL_H * m + b.$$

This intersection is illustrated geometrically in FIG. 6a. $EL_H$ is a predetermined engine load value. The point described by $MAP_H$ and $EL_H$, shown as $P_2'$ in FIG. 6a, is stored in memory at step 146 as the new $P_2$ point, replacing the previous $P_2$ point. This new $P_2$ point is then used as a reference point in future $index_1$ recalibrations, just as the point $P_1$ was used at step 140 of this $index_2$ recalibration. The ECM then returns, via step 148, to step 92 of the routine illustrated in FIG. 4a.

The foregoing description of a preferred embodiment for the purpose of explaining the principles of this invention is not to be considered as limiting or restricting the invention since many modifications may be made by the exercise of skill in the art without departing from the scope of this invention.

The embodiment of the invention in which an exclusive property or privilege is claimed are defined as follows:

1. A method for controlling recirculation of exhaust gases into an air intake of an internal combustion engine, comprising the steps of:
   determining when said engine is in a predetermined state wherein exhaust gas is not recirculated;
   measuring predetermined parameters used in said exhaust gas recirculation control when said engine is in said predetermined state wherein exhaust gas is not recirculated;
   estimating reference relationships between said parameters that apply over the entire engine operating range using said measured parameters and previous measurements of said parameters;
   controlling subsequent exhaust gas recirculation based on said reference relationships.

2. The method of claim 1, wherein said measuring step further comprises the step of measuring engine intake manifold absolute pressure and measuring engine load.

3. The method of claim 1, wherein said step of determining when said engine is in said predetermined state wherein exhaust gas is not recirculated further comprises the steps of: (a) measuring engine speed, (b) measuring engine load, (c) comparing engine speed to a predetermined low engine speed range, (d) comparing engine load to a predetermined low engine load range, (e) comparing engine speed to a predetermined high engine speed range, (f) comparing engine load to a predetermined high engine load range, (g) determining that said engine is in a state wherein exhaust gas is not recirculated when said measured engine speed and said measured engine load are both within their respective low ranges or are both within their respective high ranges.

4. A method of controlling recirculation of exhaust gases into an air intake of an internal combustion engine, comprising the steps of:

controlling the amount of exhaust gases over a predetermined operating region of the engine in accord with a predetermined schedule that is based upon a reference relationship between values of predetermined engine operating parameters over the predetermined operating region of the engine, the reference relationship representing the relationship between the values of predetermined engine operating parameters in the absence of recirculated exhaust gases;

measuring the values of the predetermined parameters;

sensing a first engine operating state wherein exhaust gases are not recirculated;

sensing a second engine operating state wherein exhaust gases are not recirculated;

when one of the first or second engine operating states are sensed (a) determining the relationship between the measured values of the predetermined parameters and (b) recalibrating the reference relationship between the values of the predetermined engine operating parameters over the predetermined operating region of the engine from the determined relationship and the determined relationship when the other one of the first or second engine operating states was last sensed.

5. A method for controlling recirculation of exhaust gases into an air intake of an internal combustion engine, comprising the steps of:

measuring engine speed;

measuring engine air ingestion per cycle;

determining when said engine is operating in a first engine operating state wherein exhaust gas is not recirculated by determining when said engine speed is within a first engine speed range and said engine air ingestion per cycle is within a first engine air ingestion range;

determining when said engine is operating in a second engine operating state wherein exhaust gas is not recirculated by determining when said engine speed is within a second engine speed range and said engine air ingestion per cycle is within a second engine air ingestion range;

when one of said first or second engine operating states are sensed, (a) determining the relationship between engine air ingestion per cycle and engine intake manifold absolute pressure, and (b) updating a reference relationship between engine air ingestion per cycle and engine intake manifold absolute pressure over a predetermined engine operating region using said determined relationship and a determined relationship when the other one of said first or second states was last sensed;

controlling the recirculation of engine exhaust gases when said engine is operating in a third engine operating state wherein exhaust gas is recirculated, based on said updated reference relationship.

6. The method of claim 5, wherein said step of controlling the recirculation of engine exhaust gases further comprises the steps of:

(a) sensing engine intake manifold absolute pressure;
   (b) determining a desired quantity of exhaust gas to be recirculated;
   (c) expressing said desired quantity of exhaust gas to be recirculated as a desired percent increase in engine intake manifold absolute pressure;
   (d) ascertaining a desired engine intake manifold absolute pressure as a function of (1) said desired percent increase in engine intake manifold absolute pressure, (2) said engine air ingestion per cycle and (3) said updated reference relationship between said engine air ingestion per cycle and said air inlet manifold pressure;
   (e) calculating the difference between said desired air inlet manifold pressure and said sensed engine intake manifold absolute pressure;
   (f) recirculating engine exhaust gas into said inlet air charge so as to drive said pressure difference to zero.

* * * * *